May 11, 1954    S. R. HOWARD    2,678,185
VOLUMETRIC FILLING MACHINE
Filed June 15, 1951    6 Sheets-Sheet 1

INVENTOR.
Stanley R. Howard
BY
J. Stanley Churchill
ATTORNEY

INVENTOR.
Stanley R. Howard
BY
J. Stanley Churchill
ATTORNEY

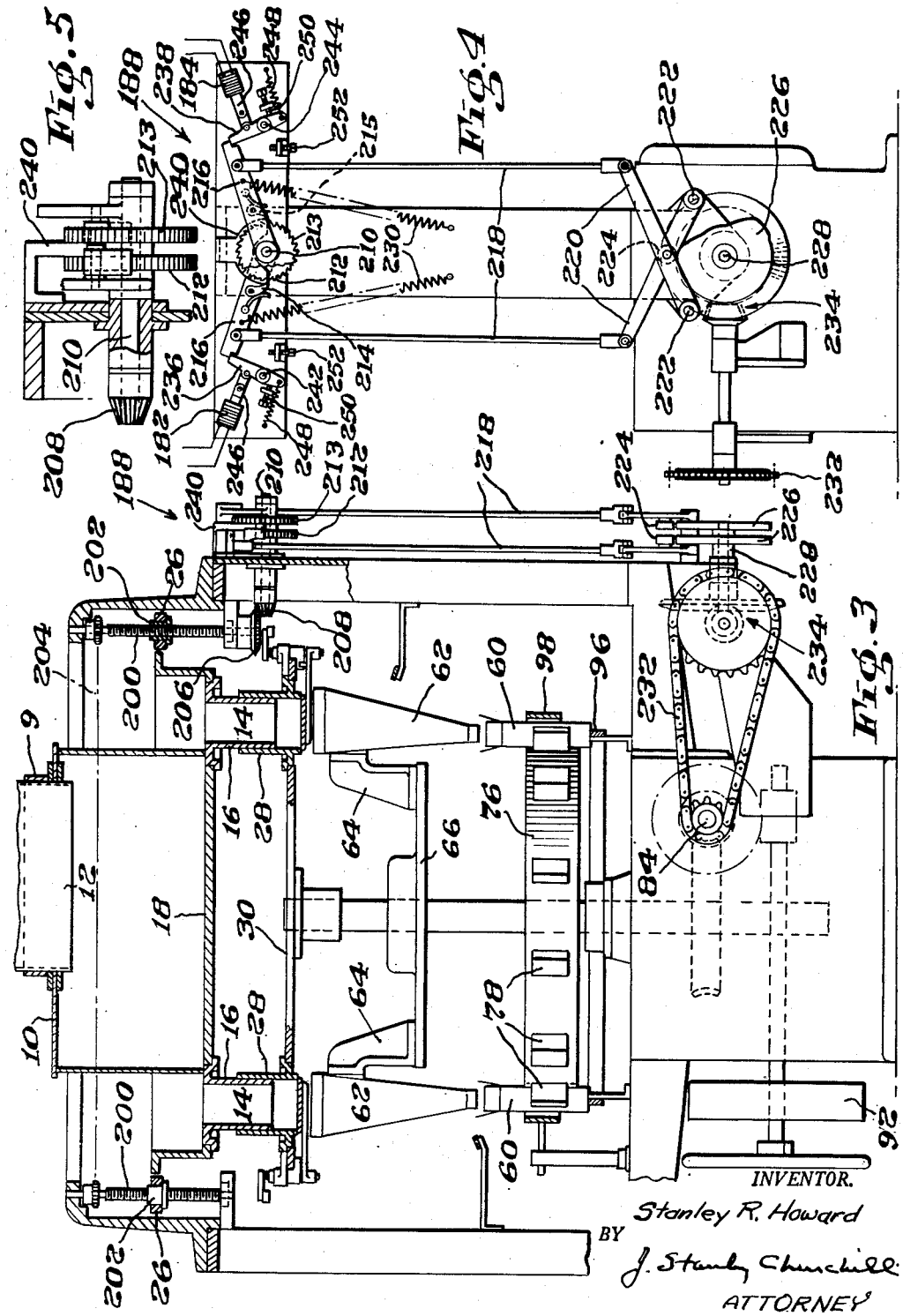

May 11, 1954     S. R. HOWARD     2,678,185
VOLUMETRIC FILLING MACHINE
Filed June 15, 1951     6 Sheets-Sheet 4
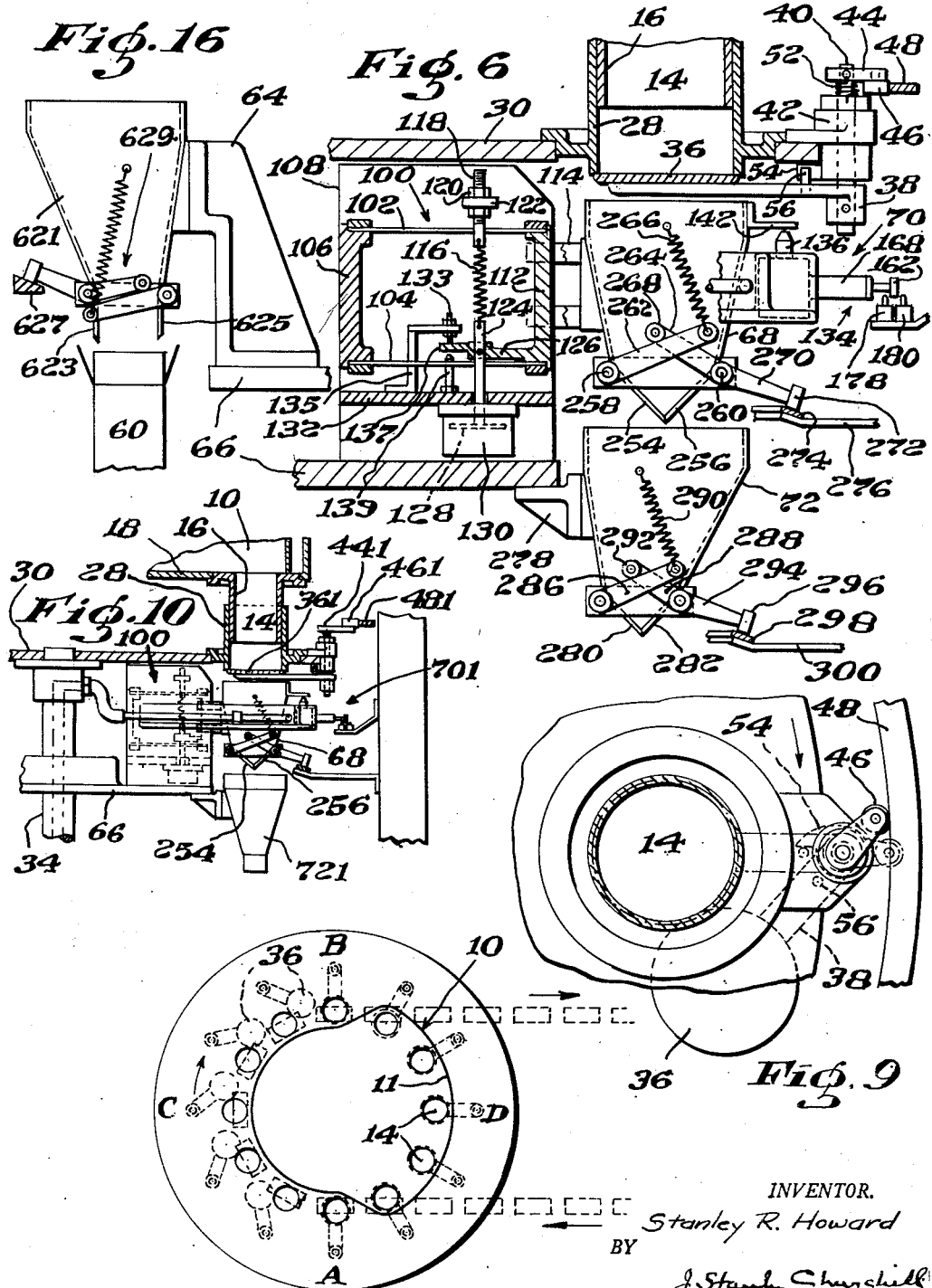
INVENTOR.
Stanley R. Howard
BY
J. Stanley Churchill
ATTORNEY

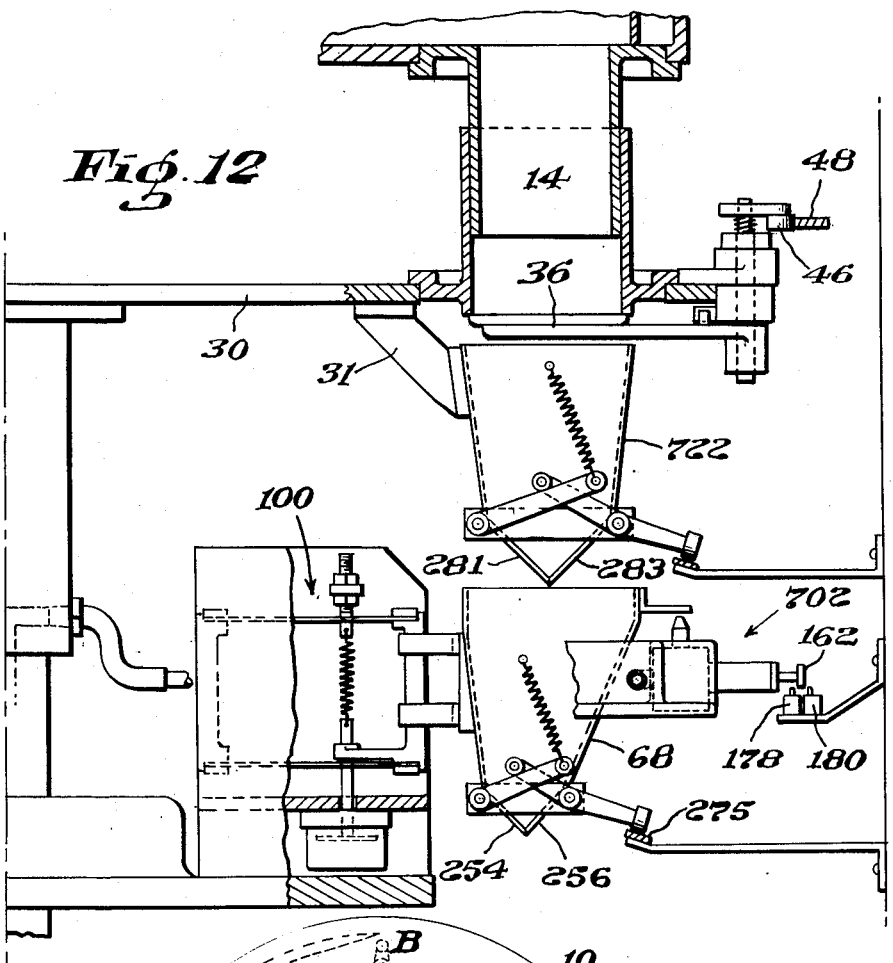
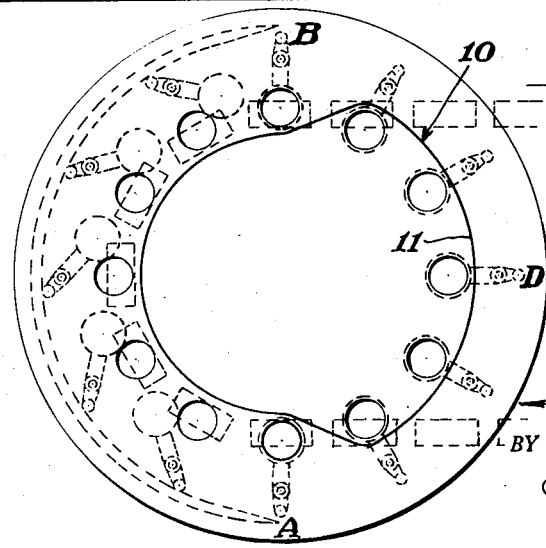

May 11, 1954     S. R. HOWARD     2,678,185
VOLUMETRIC FILLING MACHINE

Filed June 15, 1951     6 Sheets-Sheet 6

INVENTOR.
Stanley R. Howard
BY
J. Stanley Churchill
ATTORNEY

Patented May 11, 1954

2,678,185

UNITED STATES PATENT OFFICE 2,678,185

VOLUMETRIC FILLING MACHINE

Stanley R. Howard, Milton, Mass., assignor to Pneumatic Scale Corporation, Limited, Quincy, Mass., a corporation of Massachusetts Application June 15, 1951, Serial No. 231,797

14 Claims. (Cl. 249—17)

This invention relates to a volumetric filling machine.

One object of the invention is to provide a novel volumetric filling machine for forming successive measured loads of flowable solid material wherein provision is made for sampling at least one of the measured loads and check weighing the same to determine the variation in weight from a predetermined amount and for correcting the measuring apparatus in accordance with the variation in the weight of the thus sampled load.

A further and more specific object of the invention is to provide a novel volumetric filling machine wherein provision is made for operating the machine continuously, and wherein a plurality of measured loads are formed, and delivered during the continuous operation of the machine, and wherein at least one of a series of loads is check weighed during the continuous operation of the machine.

A still further object of the invention is to provide a novel volumetric filling machine of the general type illustrated in the United States patent to Delamere et al. No. 1,527,030, in which provision is made for check weighing at least one of a series of measured loads formed at each cycle of operation of the machine and for varying the volume of the measured loads thereafter formed in accordance with the variations in the weight of the check-weighed load from predetermined limits.

With these objects in view, and such others as may hereinafter appear, the invention consists in the volumetric filling machine and in the various structures, arrangements and combinations of parts hereinafter described and particularly defined in the claims at the end of this specification.

Figure 1:
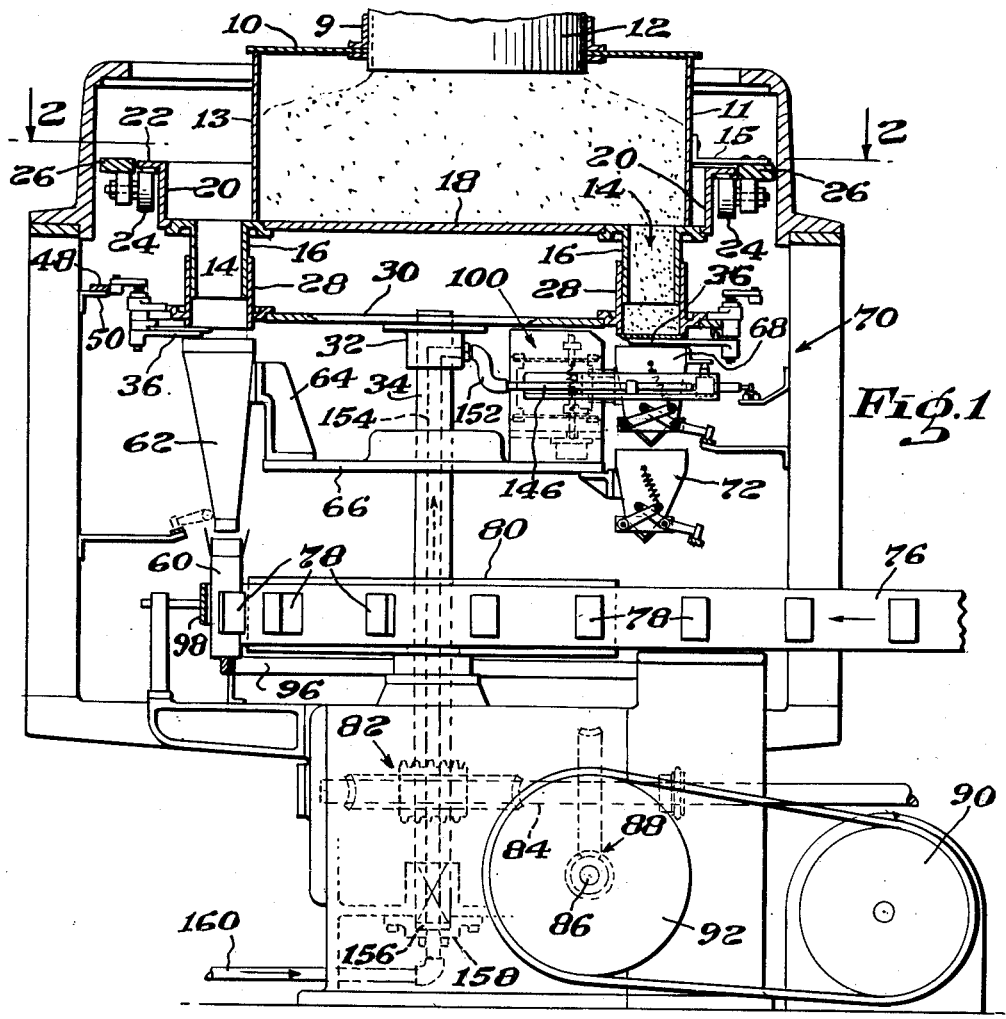
Figure 8:
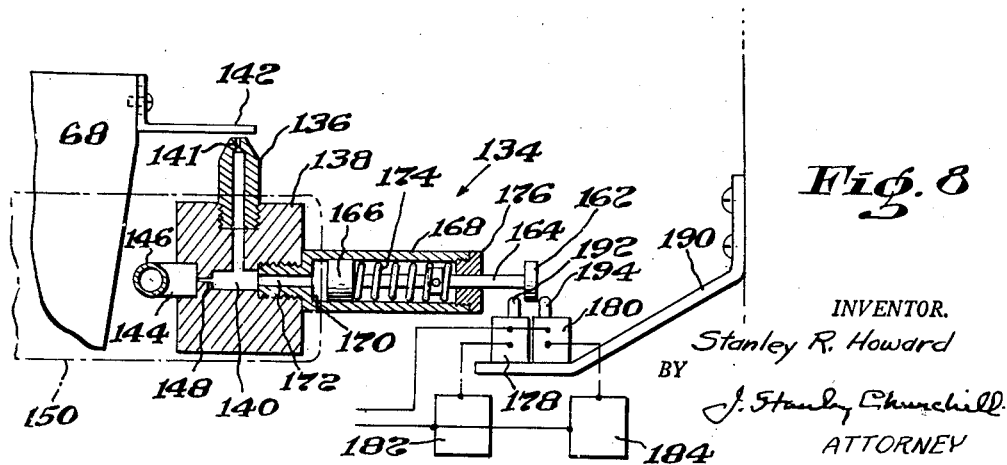
Figure 2:
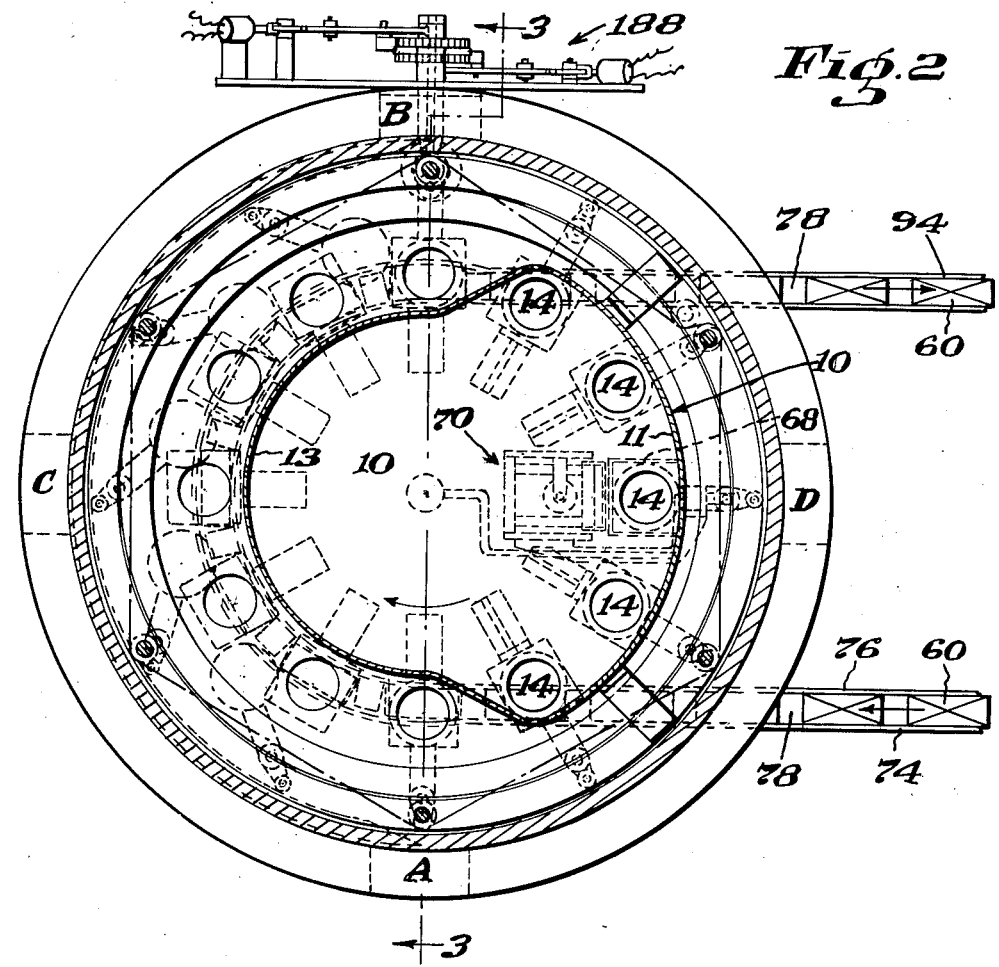
Figure 7:
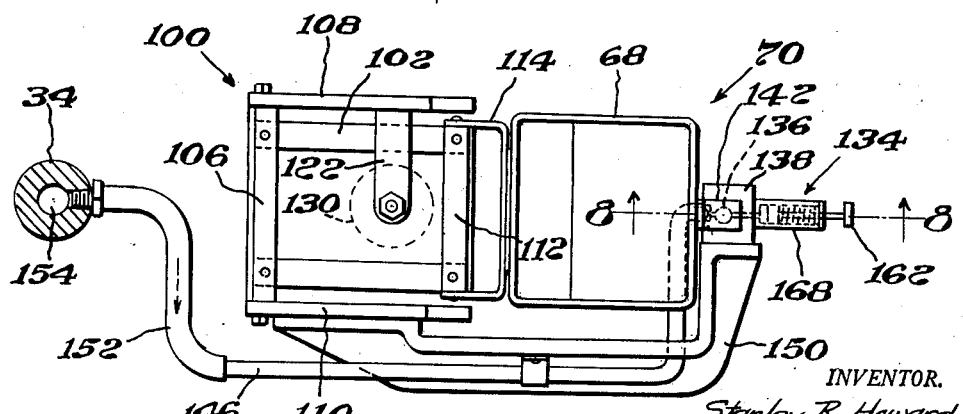
Figure 14:
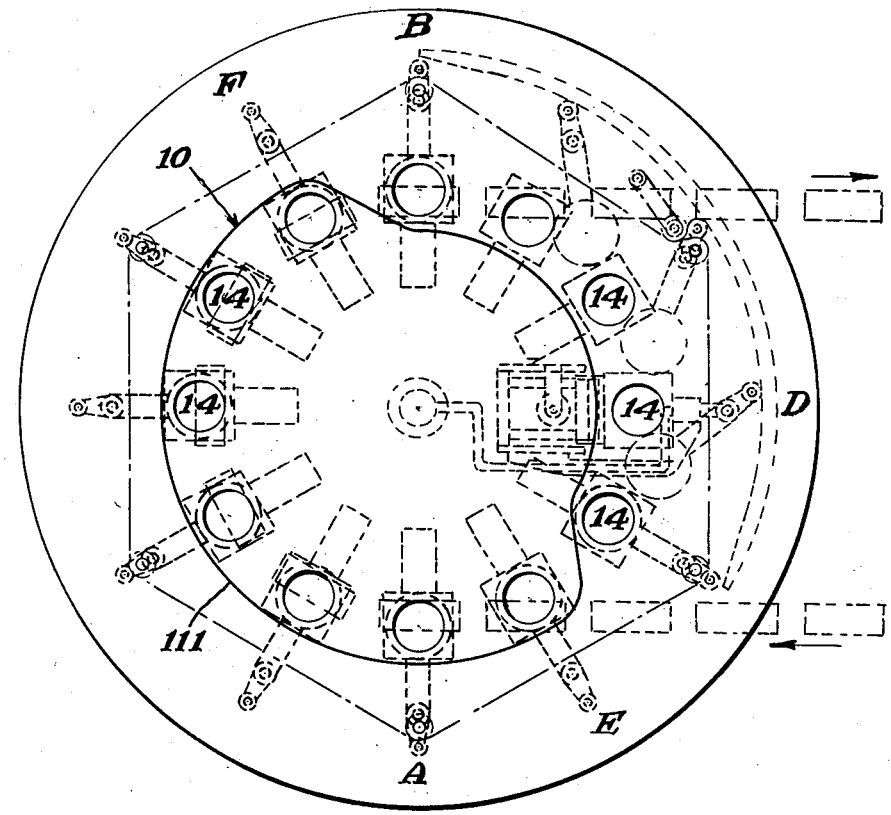
Figure 15:
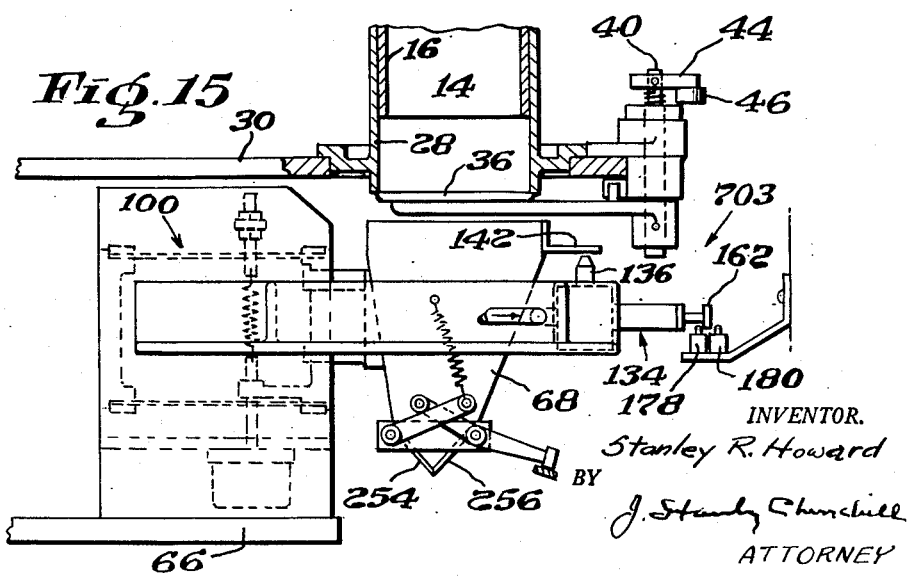

In the drawings illustrating the preferred embodiment of the invention, Fig. 1 is a side elevation, partly in cross section, of a rotary volumetric filling machine embodying the present invention; Fig. 2 is a plan view of the same as viewed from the line 2—2 of Fig. 1 and indicating diagrammatically the sequence of operation of the filling machine during a complete revolution of the rotary filling mechanism; Fig. 3 is a side elevation of the filling machine, partly in cross section, as viewed from the line 3—3 of Fig. 2 and illustrating the volume-correcting mechanism; Fig. 4 is a front elevation of the correcting mechanism shown in Fig. 3; Fig. 5 is a detail view, partly in cross section, of a portion of the correcting mechanism; Fig. 6 is a detail view of the check-weighing mechanism shown in Fig. 1, some of the parts being shown in cross section; Fig. 7 is a plan view of the check-weighing mechanism and illustrating pneumatically operated control means associated therewith; Fig. 8 is a cross-sectional view of the control mechanism taken on the line 8—8 of Fig. 7; Fig. 9 is a plan-view detail of a measuring-chamber closing valve shown in its open position; Fig. 10 is a detail view in side elevation and partly in cross section of the check-weighing mechanism embodied in a modified form of rotary volumetric filling machine; Fig. 11 is a diagrammatic plan view indicating the sequence of operations performed during a complete revolution of the modified form of filling mechanism shown in Fig. 10; Figs. 12 and 13 are views in side elevation and plan respectively similar to Figs. 10 and 11, illustrating another modified form of rotary filling and check-weighing machine, Fig. 13 diagrammatically indicating the sequence of operation during a complete revolution of the rotary filling mechanism; Fig. 14 is a plan view diagrammatically indicating the sequence of operation of still another modified form of rotary filling machine; Fig. 15 is a detail view in side elevation of the check-weighing mechanism embodied in the modification illustrated in Fig. 14; and Fig. 16 is a detail view of one of a plurality of filling funnels provided with shutters embodied in the modification illustrated in Fig. 14.

Referring now to the drawings, the invention is herein illustrated as embodied in a rotary filling machine of the general type illustrated and described in the United States patent to Delamere et al. No. 1,527,030 and which, as herein shown, may comprise a generally circular non-rotating hopper 10 containing a supply of the material delivered thereto by gravity or otherwise through a pipe 12 connected to a main source of supply, and a series of telescopically adjustable measuring chambers 14 preferably equally spaced in a circle and mounted to revolve beneath the hopper 10 to receive their loads. As illustrated in plan in Fig. 2, the hopper 10 is irregular in shape, having a side wall 11 of large radius in one portion of its circumference arranged to extend over a plurality of the chambers 14 to cause filling thereof as the chambers pass under the extended portion of the hopper. The latter is provided with a side wall 13 formed on a smaller radius so that as the chambers are rotated around such side wall they are maintained out of contact with the material in the hopper and are open to the atmosphere.

As illustrated in Fig. 1, the upper portions of the telescopically adjustable measuring chambers 14 may comprise a plurality of flanged tubes 16 supported in and depending from a rotary disk 18 which forms the bottom of the hopper. The rotary disk 18 is provided with an upstanding annular side wall 20 having a flange or track portion 22 arranged to ride on and be supported by a plurality of rollers 24 carried by a vertically adjustable supporting ring 26. The lower portions of the measuring chambers 14 may comprise a plurality of corresponding upstanding tubes 28 telescopically fitted about the upper tubes 16 and supported in a rotary disk 30 secured by a flange member 32 to the upper end of a continuously rotated central shaft 34, the telescoping connection imparting rotary movement to the upper portions of the chambers 14 during the operation of the machine.

As herein shown, each chamber 14 is provided with a cam-operated bottom closure valve 36, and in the operation of the machine, successive measuring chambers are filled as they pass under the filling portion 11 of the hopper 10 at which time the bottoms of the chambers 14 are closed by the valves 36, and when the chambers pass out from under the filling portion of the hopper, the valves may be moved to open the bottoms of the chambers to release the measured loads. As illustrated in Figs. 1, 6, and 9, each cam-operated valve 36 may be mounted on an arm 38 fast on the lower end of a vertical stud 40 rockingly supported in a bearing member 42 attached to the outer edge of the rotary disk 30 adjacent each measuring chamber 14. The upper end of the vertical stud 40 may be provided with an arm 44 also fast thereon and carrying a cam roll 46 for cooperation with a cam piece 48 supported by brackets 50 extended from the machine frame. A coil spring 52 interposed between the upper arm 44 and the bearing member 42, and having its ends connected to the arm 44 and member 42 respectively, is arranged to urge the valve 36 in a clockwise or into a closed position, as shown in dotted lines in Fig. 9, and engagement of the rolls 46 with the cam piece 48 is arranged to rock the valve in a counterclockwise direction to open the bottom of the chamber and effect release of the measured load. A stop lug 54 extended from the lower end of the bearing member 42 is arranged to cooperate with an upstanding pin 56 carried by the valve arm 38 to limit the closing position of the valve.

In accordance with the present invention and as illustrated in Figs. 1 and 2, all of the measured loads in the chambers 14, except one load, are released into successive cartons 60 being moved along therebeneath, the material being guided into the cartons through funnels 62 supported by brackets 64 attached to a rotary disk 66 fast on the central shaft 34. The remaining measured load, formed during each revolution of the chambers, may and preferably will be deposited or trapped in a weighing receptacle 68 forming a part of the check-weighing mechanism, indicated generally at 70, such check-weighed load being subsequently released into a second receptacle 72 disposed beneath the weighing receptacle, and thereafter the load is released from the lower receptacle 72 into a carton disposed therebeneath during a succeeding revolution of the filling units, as will be hereinafter more fully described.

As shown in Fig. 2, the cartons 60 may be delivered to the machine along a conveyer 74 by an upstanding flexible metal belt 76 having a series of spaced blocks 78 attached thereto and between which the cartons are engaged. The belt 76 is arranged to cooperate with a driving pulley 80 fast on the central shaft 34 and arranged to register successive cartons in alignment with their respective filling units. As illustrated in Fig. 1, the central shaft 34 may be driven through a worm-gear drive 82 connected to a shaft 84 which in turn may be connected to a drive shaft 86 through a second worm-gear drive 88. The drive shaft 86 may be driven by an electric motor 90 belted to a pulley 92 fast on the shaft 86. In the operation of the filling machine, the cartons may be delivered along the conveyer 74 from a supply thereof, and successive cartons 60 are arranged to come into alignment with successive filling units at the point of tangency with the semicircular path through which the cartons are guided in the machine, the cartons remaining in alignment with their respective filling units through 180° and then being delivered from the machine on a discharge conveyer 94. The cartons may be guided through the semicircular path on a bottom supporting rail 96 and by a side rail 98, as shown in Fig. 1.

Provision is made in accordance with the present invention for automatically correcting the volume of the telescopic measuring chambers 14 by adjusting the upper portions 16 of the chambers relative to the lower portions 28 when the weight of the measured load as detected by the check-weighing unit 70 is found to deviate abnormally beyond commercially acceptable limits, as will be hereinafter more fully described.

As illustrated in Figs. 1 and 6, the weighing unit 70 is disposed immediately beneath a measuring chamber 14, the weighing receptacle 68 being attached to and forming a part of the free end of a cantilever spring beam 100 herein shown as comprising two upper and two lower relatively stiff cantilever leaf springs 102, 104 of equal length, the leaf springs being connected at their inner ends to a rigid immovable member 106 attached to and extended between upstanding side frame members 108, 110 mounted on the rotary supporting disk 66. The other ends of the leaf springs 102, 104 may be secured to a second rigid member 112 to which the weighing receptacle 68 is attached by straps 114. The two rigid members 106, 112 together with the leaf springs 102, 104 constitute a four-bar linkage so that when a load is placed within the weighing receptacle, the weight thereof results in imparting to the receptacle a straight-line motion in a vertical direction so that every particle in the weighing receptacle moves with the same displacement, direction, and velocity and so that any particle produces the same spring deflection no matter where it is located in the receptacle. The weighing beam 100 is also provided with a coil spring 116 arranged to exert a counterforce upon the spring beam, the spring 116 being connected at its upper end to a bolt 118 adjustably secured by nuts 120 in a bracket 122 attached to the side-frame member 108, as shown in Fig. 7. The lower end of the coil spring 116 may be connected to a rod 124 fast in an arm 126 extending from and integral with the rigid member 112 of the spring beam 100. The rod 124 may extend below the arm 126 and may be provided with a piston 128 operating in oil contained in a dash pot 130 attached to the underside of a tie plate 132 extended between and secured to the side-frame members 108, 110. The cantilever spring beam 100 may be adjustably limited in its vertical movement by an upper adjusting screw 133 carried by a bracket 135 attached to the tie plate 132, the screw 133 being engageable with the upper surface of an extended portion 137 of the arm 126, and by a lower stop screw 139 secured to the plate 132 and engageable with the undersurface of the extended portion 137. In practice, the coil spring 116 serves to counteract the weight of the weighing receptacle 68 and associated parts which are mounted upon the outer ends of the leaf springs, the coil spring 116 being of such strength as to support nearly all of the weight of the measured load being check weighed without deflection of the leaf springs so that the deflection of the leaf springs may be proportionate to the deviation in weight above a predetermined minimum weight limit. For example, a load weight of 15 ounces may be used, and weights above 15 ounces will deflect the leaf springs proportionately to the excess above 15 ounces.

In the illustrated embodiment of the invention, provision is made for measuring the deflection of the spring beam 100 when depressed by the load being check weighed to indicate the weight of the load and more particularly to detect any deviation over or under a predetermined weight within commercially acceptable tolerances. In practice, the stiff cantilever springs 102, 104 are selected so that the weighing beam has a relatively small deflection value, and sensitive pneumatically operated control means indicated generally at 134 is arranged to cooperate with the present spring beam for indicating or measuring the relatively small deflection of the spring beam when depressed by the load released from a measuring chamber 14. The pneumatically operated unit 134 is constructed so that a large pressure change occurs upon deflection of the spring beam through a minute distance, and in general, the deflection of the spring beam is arranged to increase the pressure in the pneumatically operated unit by an amount proportionate to the deflection, an overweight load effecting a relatively large increase in pressure, and an underweight load increasing the pressure a lesser amount, and such different pressures may be translated into movement to effect closing of either an overweight or an underweight switch for actuating the volume-correcting mechanism whereby to effect a decrease or an increase respectively in the volume of the measuring chambers 14 when an abnormal deviation from a predetermined weight is detected.

As shown in Figs. 7 and 8, the pneumatically operated control mechanism 134 may comprise a conduit or jet member 136 carried by a block 138 having a chamber 140 communicating with the jet and through which air under substantial pressure may be caused to flow to be discharged through a small discharge orifice 141 in the jet arranged to cooperate with a valve member 142 carried by and movable with the receptacle 68. The inlet 144 may be supplied with a regulated source of air through a pipe 146, and the chamber 140 is provided with a restricted throat portion 148 adjacent its inlet end arranged to offer a substantial resistance to the flow of air therethrough. The block 138 may be secured to an outboard bracket 150 attached to the side-frame member 110, and as shown in Fig. 1, the inlet pipe 146 may be connected by a flexible hose 152 to a central passageway 154 formed in the continuously rotated central shaft 34, the lower end of the passageway 154 communicating with a chamber 156 formed in a flanged bearing member 158 which in turn may be connected by a pipe 160 to the source of air thereby enabling the pneumatically operated unit 134 to be supplied with air during the continuous rotation of the check-weighing unit 70 with the shaft 34. In operation, the spring-beam unit 100 may be adjusted to maintain the valve member 142 in a slightly elevated position spaced from the small discharge orifice 141, and upon minute deflection of the spring beam under the influence of the load, the valve 142 is moved toward the discharge orifice a minute amount thereby effecting a substantial pressure rise in the chamber 140 between the discharge orifice 141 and the restricted throat portion 148.

As herein shown, provision is made for utilizing the increase in pressure in the chamber 140 to effect movement of a contact-closing member 162 formed on one end of a piston rod 164 having a head 166 at its other end and supported for reciprocation in a laterally extended cylinder 168 connected to the block 138. The cylinder 168 is provided with a chamber 170 communicating with the pressure chamber 140 through a passageway 172, and a spring 174 coiled about the rod 164 and interposed between the piston head 166 and the end wall 176 of the cylinder is arranged to normally urge the rod 164 and the contact member 162 to the left, viewing Fig. 8. The contact member 162 is arranged to cooperate with either of two switches comprising an underweight circuit-closing switch 178 or an overweight circuit-closing switch 180 connected in the appropriate circuit to effect energization of solenoids 182 or 184 respectively, the solenoids forming a part of the volume-correcting mechanism, indicated generally at 188, see Fig. 4. The switches 178, 180 may be supported in suitably spaced relation on a bracket 190 attached to the machine frame, and in operation, when a normal or predetermined weight load is received in the weighing receptacle 68, the deflection of the spring beam and movement of the valve member 142 toward the discharge orifice 141 will be such as to effect a pressure rise in the chamber 140 sufficient to extend the contact member 162 to an intermediate position between the two switches 178, 180, as illustrated in Fig. 8, so that neither switch is closed during subsequent rotation of the contact member past the switches, and no correction of volume of the measuring chambers will be made. However, in the event that the load check weighed is found to be abnormally underweight, the valve member 142 will be moved toward the discharge orifice 141 a relatively lesser distance, and as a result the rise in pressure in the chamber 140 will be correspondingly less so as to extend the contact member 162 to a position in the path of a switch-closing pin 192 of the underweight switch 178 to subsequently effect closing of the switch 178 and energization of the solenoid 182 to cause the correcting mechanism to effect an increase in the volume of the measuring chambers 14. On the other hand, should the load being check weighed be found to be abnormally overweight, the valve member 142 will be moved relatively closer toward the discharge orifice 141 resulting in a pressure rise in the chamber 140 sufficient to extend the contact member 162 a relatively greater distance outwardly into the path of the switch-closing pin 194 of the overweight switch 180 to subsequently effect closing of the circuit to energize the overweight solenoid 184 to cause the correcting mechanism 188 to effect a decrease in the volume of the measuring chambers 14.

Referring now to Figs. 3, 4, and 5, the correcting mechanism 188 for automatically adjusting the upper portions 16 of the measuring chambers 14 relative to the lower portions 28 thereof, to vary the volume of the chambers 14 when the weight of the measured load is found to deviate abnormally beyond the commercially acceptable limits as detected by the check-weighing unit 70, may include a plurality of screws 200 rotatably mounted in the machine frame and arranged to cooperate with nuts 202 secured in the supporting ring 26. The screws 200 may be connected to rotate together by a chain and sprocket drive 204, and one of the screws may be provided with a bevel gear 206 arranged to mesh with a bevel gear 208 fast on a shaft 210 mounted for rotation in the machine frame. In operation, rotation of the screws 200 in one direction will effect elevation of the upper portions 16 of the measuring chambers to increase the volume of subsequent loads, and rotation of the screws in the opposite direction will cause the upper portions 16 of the chambers to be lowered into the lower portions 28 to decrease the volume of the chambers.

As herein illustrated, the correcting mechanism 188 adapted to be controlled in the manner described by the check-weighing unit 70 may include a pair of integral opposed ratchets 212, 213 fast on the shaft 210 and arranged to be engaged by similar spring-pressed pawls 214, 215 to effect rotation of the shaft 210 and adjustment of the chambers 14 when permitted to do so by the check-weighing mechanism. The pawls 214, 215 are carried by similar arms 216 pivotally mounted on the shaft 210, each arm being connected by similar links 218 to cam levers 220 pivotally mounted at 222. Each lever 220 is provided with a roller 224 arranged to cooperate with similar cams 226 fast on a cam shaft 228, the arms 216 being provided with springs 230 arranged to urge the linkage downwardly to permit the rollers to follow their cams. The cam shaft 228 is arranged to be rotated from the shaft 84 through a chain and sprocket drive 232 and bevel gears 234.

The pawl-carrying arms 216 are normally maintained in an elevated or locked position, as shown, by solenoid-operated latch members 236, 238 arranged to engage the ends of the arms, and the pawls are prevented from engaging their respective ratchets by a shield member 240 supported from the machine frame. As herein shown, the latch members 236, 238 are pivotally mounted at 242, 244 respectively and are connected by similar links 246 to their respective solenoids 182, 184. Springs 248 cooperating with adjustable stops 250 are arranged to hold the latch members 236, 238 in latched engagement with their respective arms 216, and in operation, when one or the other of the arms is released by its solenoid, the arm 216 is rocked downwardly by its spring 230 permitting the roller 224 to follow its cam 226, the pawl riding off the shield 240 and engaging with its ratchet to effect rocking of the shaft 210 and adjustment of the measuring chambers 14, as described. The downward rocking movement of the arms 216 may be adjustably limited by stop screws 252.

As above described, the solenoid 182 is connected in the circuit with the underweight switch 178, and in operation, the solenoid 182 is arranged to be energized to effect release of the latch 236 when the switch is closed by the contact-closing member 162, and the other solenoid 184 is connected in the circuit with the overweight switch 180 and is arranged to be energized to effect release of the latch 238 when the switch 180 is closed, thus effecting automatic adjustment of the measuring chambers 14 through definite increments when the pneumatically operated detecting mechanism 134 of the check-weighing unit 70 detects an abnormal deviation from commercially acceptable limits of a predetermined weight. During vertical adjustment of the tubes 16 with the disk 18, the hopper 10 supported on the disk 18 is moved along therewith, the upper or inlet end 9 of the hopper being slidably mounted on the end of the supply pipe 12 to permit such relative movement, and brackets 15 connected between the vertically adjustable supporting ring 26 and the hopper are arranged to prevent rotation of the hopper relative to the disk 18.

After the check-weighing, detecting, and correcting operations are completed, provision is made for releasing the weighed load from the weighing receptacle 68 into the lower receptacle 72 from which the load is subsequently released into a carton 60 being moved along therebeneath, and as herein shown, the weighing receptacle 68 may be provided with a pair of shutters 254, 256 fast on rocker pins 258, 260 mounted in suitable bearings carried by the receptacle. The rocker pins 258, 260 are provided with arms 262, 264 respectively fast thereon, one of the arms 262 being provided with a spring 266 connected thereto and arranged to urge the shutter 254 to its closed position. The other arm, 264, is provided with a roller 268 engageable with the arm 262 to effect simultaneous movement of the shutters 254, 256 to their closed position, as shown in Fig. 6. In order to open the shutters 254, 256 to effect release of the weighed load into the second receptacle 72, the rocker pin 260 is provided with an arm 270 fast thereon, the arm 270 having a roller 272 arranged to cooperate with a cam piece 274 supported by a bracket 276 attached to the machine frame. As herein shown, the lower receptacle 72 is connected by a bracket 278 to the underside of the rotary disk 66 and is also provided with a pair of bottom closing shutters 280, 282 connected by similar linkage including rocker arms 286, 288, spring 290 connected to the arm 286, and roller 292 carried by arm 288 and cooperating with the arm 286 to effect simultaneous opening and closing of the shutters 280, 282. A similar arm 294 fast on one of the rocker pins is provided with a cam roll 296 arranged to cooperate with a cam piece 298 supported by a bracket 300 attached to the machine frame, the cam 298 being designed to open the shutters 280, 282 at the appropriate time during the revolution of the filling units to effect release of the load into a carton moved along therebeneath.

In the operation of the present volumetric filling machine, as thus far described, with particular reference to the embodiment of the invention illustrated in Figs. 1 and 2, successive measuring chambers 14 are filled as they pass under the filling portion defined by the side wall 11 of the hopper 10, the chambers 14 remaining under the filling portion through substantially and slightly less than one-half of a complete revolution of the filling units, during which time the valves 36 are closed and the chambers 14 are filled. When the chambers 14 come into alignment with their respective cartons 60 at the start of the semicircular path, at the point designated A, the valves 36 are opened by the cam piece 48 to release the measured loads, the valves remaining open throughout substantially 180 degrees, to the point designated B in Fig. 2, whereupon the valves 36 are again closed.

During the travel of the filling units between A and B in a clockwise direction, all of the measured loads, except the one associated with the weighing unit 70, are delivered through the funnels 62 directly into their respective cartons 60 disposed therebeneath, the remaining load being released into the weighing receptacle 68 during which time the shutters 254, 256 are closed. Also, during such travel between the points A and B, the shutters 280, 282 of the lower receptacle 72 are opened by the cam section 298 to release the previously check-weighed load carried thereby into the carton disposed therebeneath, the shutters 280, 282 being subsequently closed substantially at the time they arrive at the point B.

During the latter part of the travel of the check-weighing unit 70 through the semicircular path between A and B, that is, after sufficient time has elapsed to assure complete release of the measured load into the weighing receptacle, the load is check weighed in the manner described whereby to cause the pneumatically operated gauging or detecting unit 134 to extend the contact-closing member 162 a distance proportionate to the weight of the load being check weighed. In practice, the measured load may be fully released into the receptacle by the time the latter has traveled about 90 degrees from the point A, that is, to the point designated C, and during the travel from point C to point B, the contact-closing member 162 may be extended as described. Subsequently, at the point designated B, or shortly thereafter, the contact-closing member 162 may engage one or the other of the switches 178, 180 or may pass between the switches, as shown in Fig. 6, closure of one or the other of the switches indicating an abnormal deviation from the predetermined weight and effecting automatic adjustment of the chambers 14 by the correcting mechanism 188, as described. The check-weighing receptacle 68 is arranged to retain its weighed load until it has traveled through approximately 90 degrees beyond the point B to a point designated D whereupon the shutters 254, 256 are opened by the cam piece 274 to release the check-weighed load into the receptacle 72, the shutters 254, 256 being subsequently closed before the check-weighing unit again arrives at point A where the shutters 280, 282 of the receptacle 72 are opened to deposit the load into its carton as above described.

Referring now to Figs. 10 and 11, in a modified form of the present volumetric filling machine, the filling and check-weighing mechanisms of the machine may be similar in all respects to those in the machine illustrated in Fig. 1 with the exception that the lower receptacle of the weighing unit 701 may comprise a funnel 721 without shutters, and the valve 361 of the chamber 14 associated with the weighing unit is arranged to be opened to deposit its load into the weighing receptacle at a later time in the cycle, the sequence of operation of the machine through a complete cycle or revolution of the filling units being as follows: The successive measuring chambers 14 are filled as they pass under the filling portion 11 of the hopper 10, the chambers remaining under the filling portion through substantially one-half of the complete revolution, or slightly less as illustrated, and during this time, the valves 36 and the valve 361 associated with the weighing unit are closed. When the chambers 14 come into alignment with their respective cartons 60 at the start, A, of the semicircular path, all of the valves except the valve 361 associated with the weighing unit 701, are opened by the cam piece 48, each non-weighed load being delivered through a funnel 62 directly into its respective carton disposed therebeneath and moved along therewith, the valves 36 remaining open throughout substantially 180 degrees to the point B in Fig. 11.

When the weighing unit 701 arrives at point A, the valve 361 remains closed, and the shutters 254, 256 of the weighing receptacle 68 are opened to release the previously check-weighed load through the open funnel 721 and into the carton disposed therebeneath, the shutters 254, 256 remaining open until the weighing unit arrives at point C or shortly prior to the arrival at point C whereupon the shutters are again closed. At point C, the valve 361 associated with the weighing unit 701 may be opened to release the measured load into the weighing receptacle 68, the load being entirely released into the receptacle during its travel between points C and B, and thereafter, during the travel of the weighing unit between points B and D, the load is check weighed to extend the contact-closing member 162 a distance proportionate to the weight of the load. The contact-closing member 162 may engage the switch unit 178, 180 substantially at point D to actuate the correcting mechanism 188, as described, in the event that the check-weighed load is found to deviate abnormally beyond the predetermined weight, the shutters 254, 256 remaining closed until the weighing unit 701 again arrives at point A whereupon the shutters are again opened to release the weighed load through the open funnel 721 directly into the carton therebeneath as above described. It will be understood that the valve 361 is closed and the chamber 14 associated with the weighing unit 701 is filled simultaneously with the check-weighing, detecting, and correcting operations during the travel of the weighing unit between B and A.

In order to effect opening of the valve 361 of the check-weighing unit 701 at the point C, instead of at A, the roller 461 of the valve-operating unit may be carried on the upper face of the valve arm 441 so as to engage a cam piece 481 disposed at a different horizontal level in the machine, as shown in Fig. 10, the remaining valves 36 being operated by the cooperation of rollers 46 and cam piece 48 as in the embodiment illustrated in Fig. 1.

In another modified form of the present invention, as illustrated in Figs. 12 and 13, the filling and check-weighing mechanisms of the machine may be similar in all respects to those of the machine illustrated in Fig. 1, with the exception that the weighing receptacle 68 of the weighing unit 702 is disposed a substantial distance below its associated measuring chamber 14, and a second or intermediate receptacle 722 supported by a bracket 31 to the rotary disk 30 is interposed between the measuring chamber 14 and the weighing receptacle 68. The intermediate receptacle 722 may be provided with shutters 281, 283, and the sequence of operation of the machine through a complete cycle or revolution of the filling units may be as follows: The successive measuring chambers 14 are filled as they pass under the filling portion 11 of the hopper 10, the chambers remaining under the filling portion throughout substantially one-half of the complete revolution, or slightly less, as illustrated, and during this time the valves 36 including the valve associated with the weighing unit 702 are closed. When the chambers 14 come into alignment with their respective cartons 60 at the start, A, of the semicircular path, the valves 36 are opened by the cam piece 48 to release the measured loads, the valves remaining open throughout substantially 180 degrees to the point B whereupon the valves are closed.

During the travel of the filling units between A and B, in a clockwise direction, all of the measured loads, except the one associated with the weighing unit 702, are delivered through the funnels 62 directly into their respective cartons 60 disposed therebeneath, the remaining measured load being released into the intermediate receptacle 722. Simultaneously therewith, the shutters 254, 256 of the weighing receptacle 68 are opened by the cam section 275 to release the previously check-weighed load carried thereby into the carton disposed therebeneath, the shutters 254, 256 being subsequently closed substantially at the time they arrive at point B.

At the point B, the shutters 281, 283 of the intermediate receptacle 722 may be opened to release the measured load into the weighing receptacle 68, the shutters 281, 283 being again closed when the weighing unit arrives at point D. During the travel of the weighing unit 702 between point D and point A, the load may be check weighed to extend the contact-closing member 162 a distance proportionate to the checked weight of the load, and the closing member 162 may engage the switch unit 178, 180 to actuate the correcting mechanism 188 in the event that the load is found to deviate abnormally beyond the predetermined weight. The shutters 254, 256 of the weighing receptacle 68 remain closed until the weighing unit 702 arrives at point A whereupon the shutters 254, 256 are again opened to release the weighed load directly into a carton, as above described.

Referring now to Figs. 14, 15, and 16, illustrating a still further modified form of volumetric filling machine embodying check-weighing mechanism and volume-correcting mechanism, the illustrated machine may be similar to the machine shown in Fig. 1 except that the hopper 10 is disposed to effect filling of the chambers 14 in a different portion of the revolution relative to the semicircular path of the cartons through the machine, and all of the funnels 621, see Fig. 16, and the single weighing receptacle 68, are provided with shutters. The sequence of operation of the machine through a complete cycle or revolution of the filling units may be defined as follows: The successive measuring chambers 14 are filled as they pass under the filling portion 111 of the hopper 10, the chambers 14 remaining under the filling portion throughout substantially one-half of the complete revolution, from a point E to a point F, during which time the valves 36 are closed. After passing point F, the valves 36 are opened to release the measured loads into their respective funnels 621 and the weighing receptacle 68 of the weighing unit 703, the valves 36 remaining open through substantially 90 degrees to point D whereupon they are closed.

When the weighing unit 703 arrives at the point D and during its travel between point D and point A, the load may be check weighed to extend the contact-closing member 162 a distance proportionate to the checked weight of the load, and the member 162 may engage the switch unit 178, 180 to actuate the correcting mechanism 188 in the event that the load is found to deviate abnormally beyond the predetermined weight. Thereafter, the shutters 623, 625 of successive funnels 621 are opened by cam piece 627 cooperating with the shutter linkage indicated generally at 629, and the shutters 254, 256 of the receptacle 68 are also opened in a similar manner when they arrive at point A to deposit their loads into the cartons 60 being moved along therewith, the shutters remaining open throughout substantially one-half of the complete revolution to the point B where the shutters are again closed to enable the funnels and the weighing receptacle to receive their measured loads from their respective chambers, as above described. It will be observed that the above-outlined procedure eliminates the need for an intermediate or supplementary funnel or receptacle associated with the weighing unit 703, the chambers 14 being filled and the funnels 621 and receptacle 68 being emptied into the cartons during the travel of the filling units through the semicircular path from A to B.

Having thus described the invention, what is claimed is:

1. In a machine of the character described, in combination, a plurality of measuring chambers mounted to be continuously moved through a closed path, means for filling said chambers during their movement through one portion of said closed path, a check weigher mounted to continuously move in a closed path, means for selectively delivering at least one of a group of said measured loads to said check weigher during the continuous movement of said measuring chambers, control mechanism operatively connected with said measuring chambers for thereafter varying the volume of said chambers in the event that said check-weighing operation indicates a variation of the weighing load beyond predetermined limits, and means for delivering said check-weighing load into a container.

2. In a machine of the character described, in combination, a continuously rotatable member provided with a plurality of circumferentially spaced measuring chambers, each chamber being adjustable as to its volume, a hopper for stirring flowable solid material mounted above said rotatable member and shaped to permit the material to flow into the measuring chambers as the latter pass under one portion thereof at each cycle of rotation of the rotary member, continuously moving container-conveying means, a check weigher mounted to continuously move in a closed circular path, means for delivering a measured load from one of the filling chambers to the check weigher during each cycle of rotation of the rotary member, control means responsive to the operation of the check weigher arranged to thereafter vary the volume of all the measuring chambers in response to variations in the weight of the check-weighed load beyond predetermined limits, and means for delivering the measured and weighed loads into the containers during conveyance thereof by said container-conveying means.

3. A volumetric filling machine as defined in claim 2 wherein a measured load is check weighed during one cycle of rotation of the rotary member and is delivered into the container during a succeeding cycle.

4. A volumetric filling machine as defined in claim 2 wherein a measured load is check weighed during one cycle and is delivered into its container during the same cycle of rotation of the rotary member.

5. In a machine of the character described, in combination, a rotary member provided with a plurality of circumferentially spaced measuring chambers open at their tops, a hopper disposed above said rotary member and shaped to permit material to flow into the measuring chambers as the latter pass under one portion of the hopper and to close the chambers to form the measured loads during movement of the measuring chambers under another portion of said hopper, check-weighing means mounted to rotate in a closed circular path, means for delivering at least one measured load from a measuring chamber to the check-weighing means during each cycle of rotation of the rotary member, means for delivering the measured loads into containers, and means for delivering the check-weighed loads into a container.

6. A volumetric filling machine as defined in claim 2 wherein the check-weighing means is mounted to rotate with the continuously rotating member.

7. In a machine of the character described, in combination, a continuously rotatable member provided with a plurality of circumferentially spaced measuring chambers, each chamber being adjustable as to its volume, means for filling the chambers during one portion of a revolution, continuously moving container-moving means, means for delivering the measured loads into their respective containers during another portion of a revolution, check-weighing means associated with one of said chambers arranged to receive and check weigh a load during the rotation of the rotatable member prior to delivery of the load into its container, control means operatively connected with said measuring chambers and responsive to the operation of said check-weighing means for varying the volume of said chambers in accordance with a variation in the weight of the check-weighed load beyond predetermined limits, means for continuously rotating said check-weighing means, and check-weighing means including a weighing receptacle arranged to retain and check weigh a measured load during a portion of one revolution, a second receptacle, means for releasing the weighed load into the second receptacle during another portion of said one revolution, and means for releasing the load from the second receptacle into its respective container during the next succeeding revolution.

8. A volumetric filling machine as defined in claim 7 wherein the check-weighing means is continuously rotated and includes a weighing receptacle arranged to release a previously check-weighed load into a container and to receive a new load during one portion of its revolution, said new load being check weighed during another portion of its revolution, the measuring chamber associated therewith being filled simultaneously with the check-weighing operation.

9. A volumetric filling machine as defined in claim 7 wherein the check-weighing means is continuously rotated and includes a non-weighing receptacle arranged to receive a measured load from its measuring chamber during one portion of a revolution, a weighing receptacle, means for releasing a previously check-weighed load from the receptacle into a carton simultaneously with the release of the measured load into the non-weighing receptacle, and means for releasing the load from the non-weighing receptacle into the weighing receptacle during another portion of the cycle.

10. A volumetric filling machine as defined in claim 7 wherein the check-weighing means is continuously rotated and includes a weighing receptacle, means for releasing a previously check-weighed load into a container simultaneously with the filling of its associated measuring chamber during one portion of its revolution, and means for releasing the newly formed load into the weighing receptacle during another portion of its revolution.

11. In a machine of the character described, in combination, a plurality of measuring chambers mounted to be continuously moved in a closed path, check-weighing means mounted to be continuously moved in a closed path, means for delivering a measured load from one of the measuring chambers to said check-weighing means during the continuous movement of both, and means for varying the volume of said plurality of measuring chambers in the event that the check-weighing operation indicates a variation of the weighing load beyond predetermined limits.

12. A machine as defined in claim 11 wherein successive measured loads are delivered at predetermined intervals to the check-weighing means during the continuous movement thereof.

13. A machine as defined in claim 11 wherein the check-weighing means is mounted below the measuring chambers and the material is delivered by gravity from a measuring chamber to the check-weighing means.

14. In a machine of the character described, in combination, a plurality of measuring chambers for volumetrically measuring flowable material mounted to be continuously moved in a closed path, each measuring chamber having means for enabling the volume thereof to be varied, a plurality of chutes mounted to be continuously moved in synchronism with the movement of the measuring chambers in a closed path disposed below said measuring chambers for delivering a measured load from each of said chutes into a container, check-weighing means, means for delivering a measured load from one of the plurality of measuring chambers to said check-weighing means during the continuous movement of said measuring chambers and chutes, container conveyer means including a portion movable in a path disposed below said chutes for continuously moving a container in synchronism with each of said chutes to receive the measured load therefrom, and means for varying the volume of said plurality of measuring chambers in the event that the check-weighing operation indicates a variation of the weighed load from predetermined limits.

References Cited in the file of this patent

UNITED STATES PATENTS

| Number | Name | Date |
|---|---|---|
| 860,877 | Mitchell | July 23, 1907 |
| 928,658 | Hoyt | July 20, 1909 |
| 1,527,030 | Delamere et al. | Feb. 17, 1925 |
| 2,100,874 | Ryan et al. | Nov. 30, 1937 |
| 2,354,087 | Raymer | July 18, 1944 |